US011694141B2

(12) United States Patent
Kim

(10) Patent No.: US 11,694,141 B2
(45) Date of Patent: Jul. 4, 2023

(54) ON-DEMAND WORKFLOW COMBINATION AND VARIANT GENERATION

(71) Applicant: Robert Bosch GmbH, Stuttgart (DE)

(72) Inventor: Hyeongsik Kim, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 16/832,917

(22) Filed: Mar. 27, 2020

(65) Prior Publication Data
US 2021/0304090 A1 Sep. 30, 2021

(51) Int. Cl.
| | |
|---|---|
| *G06Q 10/06* | (2023.01) |
| *G06Q 10/0633* | (2023.01) |
| *G06F 16/903* | (2019.01) |
| *G06N 5/02* | (2023.01) |
| *G06F 16/955* | (2019.01) |
| *G06F 16/951* | (2019.01) |

(52) U.S. Cl.
CPC ....... *G06Q 10/0633* (2013.01); *G06F 16/903* (2019.01); *G06F 16/951* (2019.01); *G06F 16/9558* (2019.01); *G06N 5/02* (2013.01)

(58) Field of Classification Search
None
See application file for complete search history.

(56) References Cited

U.S. PATENT DOCUMENTS

| | | | |
|---|---|---|---|
| 6,915,294 B1 * | 7/2005 | Singh | G06F 16/951 |
| 2004/0103014 A1 | 5/2004 | Teegan et al. | |
| 2008/0285075 A1 * | 11/2008 | Yamanakajima | G06F 9/5038 |
| | | | 358/1.15 |
| 2008/0320486 A1 * | 12/2008 | Bose | G06Q 10/10 |
| | | | 718/105 |
| 2010/0064357 A1 | 3/2010 | Baird et al. | |
| 2011/0113008 A1 | 5/2011 | Jafri et al. | |

(Continued)

OTHER PUBLICATIONS

Medeiros et al., WOODSS and the Web: Annotating and Reusing Scientific Workflows, Special Interest Group on Management of Data of the Association for Computing Machinery (ACM), SIGMOD Record, vol. 34, No. 3, Sep. 2005.

(Continued)

*Primary Examiner* — Alan Torrico-Lopez
(74) *Attorney, Agent, or Firm* — Brooks Kushman P.C.

(57) ABSTRACT

Workflows stored in a workflow database are annotated, each of the workflows including an ordered sequence of steps. Sub-workflows are extracted from the workflows by splitting the workflows into sub-workflows at annotations that exist between the steps, a first of the sub-workflows including the respective annotation as an output of the first of the sub-workflows, a second of the sub-workflows including the respective annotation as an input to the second of the sub-workflows. Annotations in common between the sub-workflows are identified, including identifying beginning sub-workflows that include the respective annotation as an output and identifying ending sub-workflows that include the respective annotation as an input. The sub-workflows are recombined into new workflows by splicing together the sub-workflows at the annotations in common, such that each new workflow is formed from one of the beginning sub-workflows followed by one of the ending sub-workflows.

18 Claims, 15 Drawing Sheets

(56) References Cited

U.S. PATENT DOCUMENTS

| | | | |
|---|---|---|---|
| 2013/0218626 A1* | 8/2013 | Duquette | G06Q 10/06 705/7.23 |
| 2015/0220624 A1* | 8/2015 | Bhatt | G06F 16/338 707/722 |
| 2015/0287051 A1* | 10/2015 | Baig | G06Q 30/0201 705/7.29 |
| 2021/0056648 A1* | 2/2021 | Ekambaram | G06N 20/00 |

OTHER PUBLICATIONS

Goderis et al., Seven Bottlenecks to Workflow Reuse and Repurposing, International Semantic Web Conference 2005, Springer-Verlag, Berlin, Heidelberg.

* cited by examiner

ON-DEMAND WORKFLOW COMBINATION AND VARIANT GENERATION

TECHNICAL FIELD

The present disclosure relates to systems and methods for combining workflows to generate variants of the workflows on-demand.

BACKGROUND

Workflows describe procedural knowledge using organized and repeatable patterns of actions or operations. In many domains, such as cooking, engineering, and science, workflows are widely used. As some examples, workflows may describe the operations performed in order to transform materials, provide services, process information, or cook ingredients, in a manner that can be systemically repeated for achieving consistent, predictable results.

SUMMARY

According to one or more illustrative examples, a method for workflow recombination includes annotating workflows stored in a workflow database, each of the workflows including an ordered sequence of steps, each of the steps indicating an action to be performed, the annotations indicating pre-conditions to be fulfilled for execution of the respective steps to be performed and outputs of the respective steps; extracting sub-workflows from the workflows by splitting the workflows into sub-workflows at annotations that exist between the steps, a first of the sub-workflows including the respective annotation as an output of the first of the sub-workflows, a second of the sub-workflows including the respective annotation as an input to the second of the sub-workflows; identifying annotations in common between the sub-workflows as extracted, including identifying beginning sub-workflows that include the respective annotation as an output and identifying ending sub-workflows that include the respective annotation as an input; and recombining the sub-workflows into new workflows by splicing together the sub-workflows at the annotations in common, such that each new workflow is formed from one of the beginning sub-workflows followed by one of the ending sub-workflows.

According to one or more illustrative examples, a system for workflow recombination, includes a workflow database; a domain knowledgebase; and a processor. The processor is programmed to annotate workflows stored in the workflow database, each of the workflows including an ordered sequence of steps, each of the steps indicating an action to be performed, the annotations indicating pre-conditions to be fulfilled for execution of the respective steps to be performed and outputs of the respective steps, the pre-conditions and outputs being specified in the annotations as standardized terms from the domain knowledgebase; extract sub-workflows from the workflows by splitting the workflows into sub-workflows at annotations that exist between the steps, a first of the sub-workflows including the respective annotation as an output of the first of the sub-workflows, a second of the sub-workflows including the respective annotation as an input to the second of the sub-workflows; identify annotations in common between the sub-workflows as extracted, including identifying beginning sub-workflows that include the respective annotation as an output and identifying ending sub-workflows that include the respective annotation as an input; and recombine the sub-workflows into new workflows by splicing together the sub-workflows at the annotations in common, such that each new workflow is formed from one of the beginning sub-workflows followed by one of the ending sub-workflows.

According to one or more illustrative examples, non-transitory computer-readable medium includes instructions for workflow recombination that, when executed by a processor, cause the processor to annotate workflows stored in a workflow database, each of the workflows including an ordered sequence of steps, each of the steps indicating an action to be performed, the annotations indicating pre-conditions to be fulfilled for execution of the respective steps to be performed and outputs of the respective steps, the pre-conditions and outputs being specified in the annotations as standardized terms from the domain knowledgebase; extract sub-workflows from the workflows by splitting the workflows into sub-workflows at annotations that exist between the steps, a first of the sub-workflows including the respective annotation as an output of the first of the sub-workflows, a second of the sub-workflows including the respective annotation as an input to the second of the sub-workflows; identify annotations in common between the sub-workflows as extracted, including identifying beginning sub-workflows that include the respective annotation as an output and identifying ending sub-workflows that include the respective annotation as an input; and recombine the sub-workflows into new workflows by splicing together the sub-workflows at the annotations in common, such that each new workflow is formed from one of the beginning sub-workflows followed by one of the ending sub-workflows.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A workflow refers to an ordered sequence of discrete steps or operations of a process. Each step of a workflow includes an operation to be performed after the completion of the previous step. Each step may also require one or more preconditions, such as items of equipment to be used, products obtained from previous steps of the workflow, other inputs to the step, and/or states of being that are required for performance of the step. Each step may further provide one or more results, such as products, or transitions to a different state.

Workflow management systems have been developed to allow users to effectively compose and edit workflows, as well as to manage the workflows created. While such systems provide user interfaces and tools to express the workflows, composing and/or adjusting workflows may be a challenging process for users because the users still need to make extensive efforts to formalize and encode the workflow steps.

Many workflows are being created and shared publicly. It would be beneficial to re-use and re-purpose these existing workflows to allow users can combine existing workflows to avoid redraft the workflows from scratch. However, this is often a difficult process. Users need to search for relevant workflows, retrieve the workflows, and then re-assemble the workflows by copying the relevant parts of the workflows, pasting them, and interlinking them. Such a process may be a time-consuming and may require extensive effort. Some users may learn and remember the workflows such that the combining process can be optimized to some degree. However, new users may lack the domain knowledge to be able to easily re-use and re-purpose the workflows, as it is also challenging to transfer knowledge between users.

Figure 1:
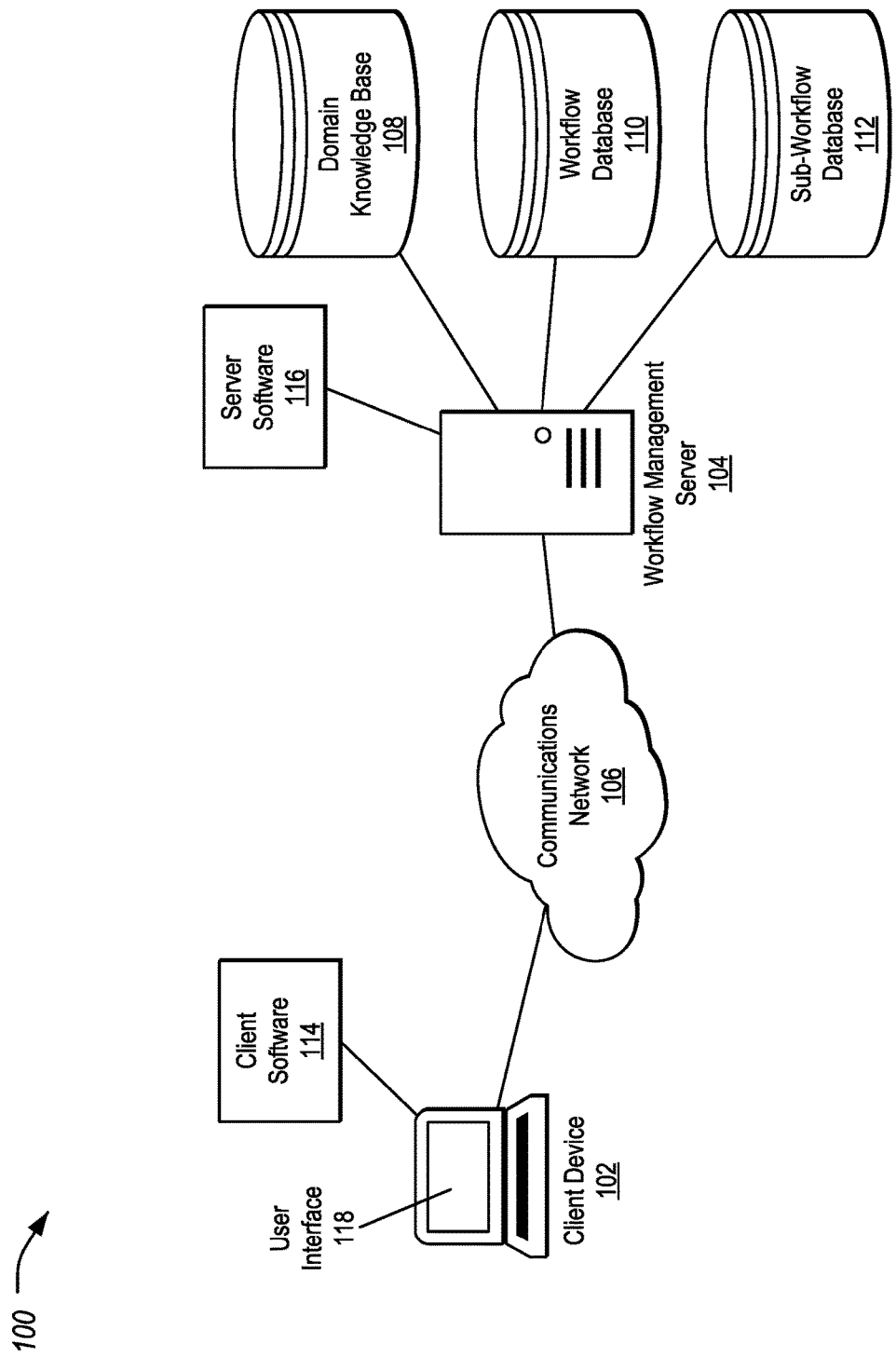
FIG. 1 illustrates an example workflow management system for the intelligent organization and automatic combination of workflow data.

FIG. 1 illustrates an example workflow management system 100 for the intelligent organization and automatic combination of workflow data. As explained in further detail herein, the workflow management system 100 may intelligently organize workflows, automatically combine the workflows, and enable users to easily create and explore the combination of workflows, which maximizes the utilization of existing workflows, thereby reducing user effort. In this illustrated example, the workflow management system 100 includes a client device 102 configured to execute client software 114 to communicate with a server 104 over a communications network 106. The server 104 may execute server software 116 and may be configured to access a domain knowledgebase 108 and a workflow database 110. It should be noted that while the example workflow management system 100 of FIG. 1 illustrates a client-server system, other types of systems may be utilized as well, such as a local system performing both the client and server roles.

The client devices 102 include various devices usable to access the functionality provided by the workflow management server 104 over the communication network 106. The client devices 102 may include laptop computers, tablet or other handheld computers, mobile phones, computer workstations, servers, desktop computers, wearables, or various other types of computing system and/or device with network and processing capabilities sufficient to perform the operations described herein. The server 104 may include various types of computing apparatus, such as a computer workstation, a server, a desktop computer, a virtual server instance executed by a mainframe server, or some other computing system and/or device.

Computing devices, such as the client devices 102 and server 104, generally include a memory on which computer-executable instructions may be maintained, where the instructions may be executable by one or more processors of the computing device. Such instructions and other data may be stored using a variety of computer-readable media. A computer-readable medium (also referred to as a processor-readable medium or storage) includes any non-transitory (e.g., tangible) medium that participates in providing data (e.g., instructions) that may be read by a computer (e.g., by the processor of the client device 102 or the server 104). In general, processors receive instructions, e.g., from the memory via the computer-readable storage medium, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, JAVA SCRIPT, PERL, PL/SQL, etc.

The server 104 may include instructions that, when loaded into memory and executed by the server 104, cause the server 104 to perform database functionality including the storage, update, and retrieval of relational information. Databases or data repositories such as the domain knowledgebase 108 and the workflow database 110, may include various kinds of mechanisms for storing, accessing, and retrieving various kinds of data, including a hierarchical database, a set of files in a file system, an application database in a proprietary format, a relational database management system (RDBMS), etc. In an example, the RDBMS may employ the Structured Query Language (SQL) in addition to a language for creating, storing, editing, and executing stored procedures, such as the PL/SQL language mentioned above.

The communication network 106 may include one or more interconnected communication networks such as the Internet, a cable television distribution network, a satellite link network, a local area network, a wide area networks, and a telephone network, as some non-limiting examples. In an example, the client devices 102 may be configured to access the server software 116 by using a web browser application. As another possibility, the client devices 102 may execute a thick client application, or "app", configured to provide access to the server software 116 (e.g., as downloaded from an application store, installed from media, etc.).

The domain knowledgebase 108 is a database that stores a formal definition of entities in the domains of interest and the relationships of these entities. The entities may include real-world objects, events, situations, or abstract concepts, as some examples. The entities in the domain knowledgebase 108 may be represented by formal structures, and standardized terminologies (e.g., through the use of a controlled vocabulary) to allow both people and computers to process the data efficiently and unambiguously, as well as to infer new entities and their relationships. As some possibilities, the controlled terminologies and vocabularies can be represented using ontology or schema languages such as Resource Description Framework Schema (RDFS) or W3C Web Ontology Language (OWL) and/or using various file formats such as XLS, PDF, XML, etc.

The workflow database 110 is a database that stores workflow information. The workflow information may include sequences of actions or steps that reach a particular goal state when the actions or the steps are performed in sequence order. To formally describe the action, step, and constraints used in plans or workflows, the workflow information may be maintained in a machine-readable, standardized language, or representation. One such example representation that may be used is the Planning Domain Definition Language (PDDL).

The sub-workflow database 112 is a database that stores sub-workflow information. As discussed in detail herein, sub-workflows are portions of workflows that are split out for reuse, in accordance with the operation of the system 100.

The client software 114 may be an application or library included on the storage of or otherwise accessible by the client device 102. The client software 114 may be configured to provide a user interface 118 to the workflow management system 100 provided by the server 104 and accessible by users (e.g., lay users, domain experts, etc.). The server software 116 may be an application or library included on the storage of or otherwise accessible by the server 104. The server software 116 may provide a remote interface (e.g., an API) to server 104 side of the workflow management system 100. The remote server 104 connection and the remote interface between the client device 102 and the server 104 may be implemented using various remote interface standards such as RESTful API, RPC, etc. When accessed by the client software 114 executed by the client device 102, the server software 116 may be configured to allow users to access, view, and update aspects of the information maintained by the domain knowledgebase 108 and the workflow database 110, including the workflows and domain knowledge.

For sake of the discussion, the cooking domain may be used as an example domain for workflows. This domain may include a domain knowledgebase 108 that includes factual knowledge on nutrients, ingredients, kitchenware, etc., as well as a workflow database 110 that includes procedural knowledge such as recipes. It should be noted, however, that this is only one example, and the described techniques can be applied to other domains, such as the automotive domain (e.g., components for vehicles also can be similarly selected and assembled on requirements and available sub-workflows) as one other example.

Aspects of the workflow management may include two types of interfaces or execution modes: (i) a terminology management mode and (ii) a workflow management mode. Each of these is discussed in turn.

Figure 2:
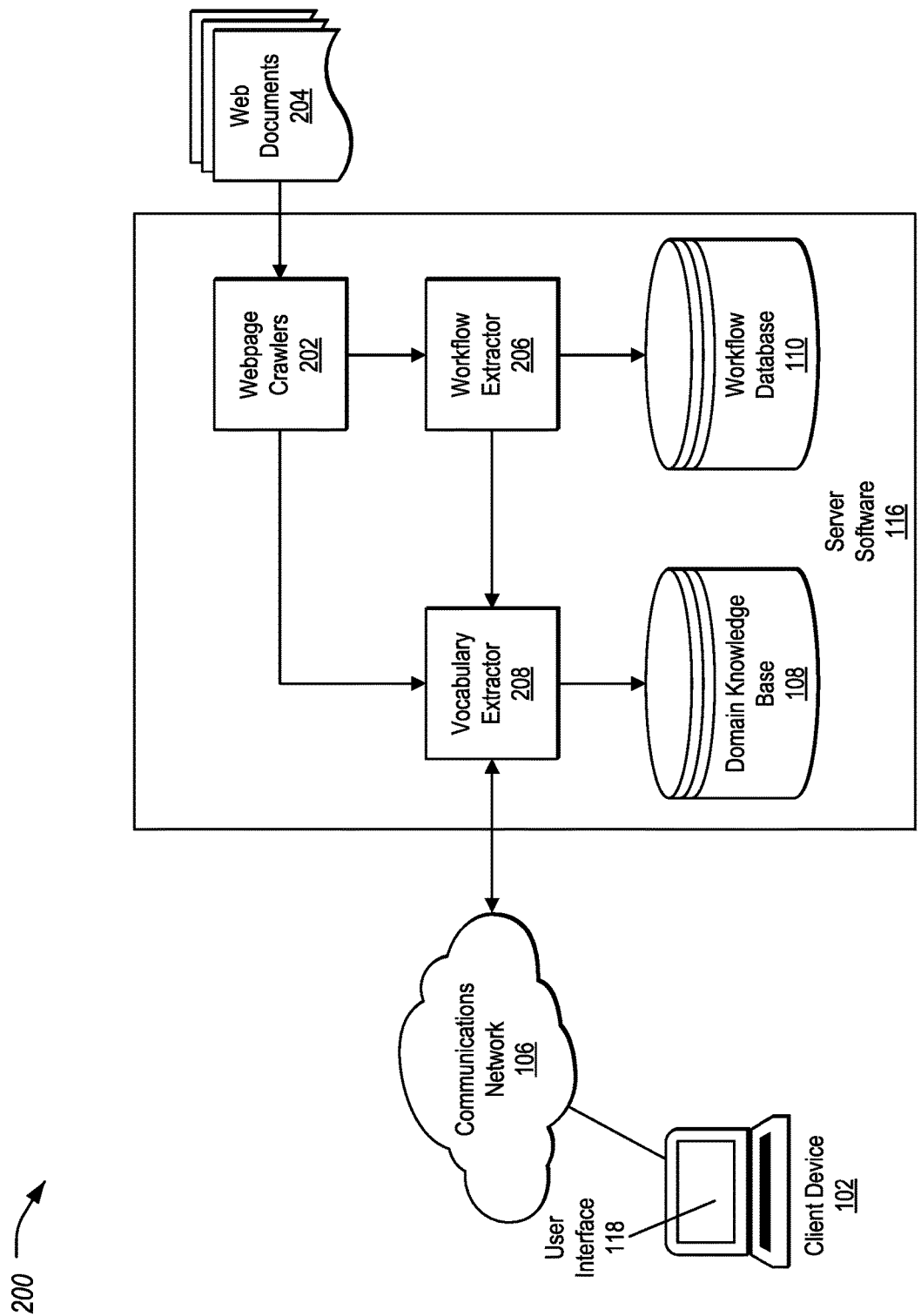
FIG. 2 illustrates an example data flow for standardizing and organizing of terms in the terminology management mode.

FIG. 2 illustrates an example 200 data flow for standardizing and organizing of terms in the terminology management mode. In the terminology management mode, domain experts may utilize the system 100 via the client device 102 to standardize and organize terms.

In one example, the standardizing and organizing of terms may be performed in a manual mode. The manual mode may allow for adding terms manually by general users or domain experts using the user interface 118 of the client device 102. The manual mode may be useful as standardized terms often need to be added or modified by general users or domain experts before or while users compose or edit workflows. For example, it is possible that an action (e.g., "boil") may not exist when users try to use that term for describing recipe flows. In that case, users or domain experts may manually add the terms into the system 100 so that they can use the term for describing workflow steps.

Additionally or alternately, the standardizing and organizing of terms may be performed in an automatic mode. In the automatic mode, the system 100 may autonomously collects data for terminologies and/or workflows available from a data source, such as the Internet. As shown in FIG. 2, the server software 116 backend of the system 100 may run a webpage crawler 202 that systematically and automatically browses web documents 204 to identify relevant webpages and workflows. Sometimes referred to as a spider, the webpage crawler 202 may be configured to start with a seed list of web addresses (such as universal resource locators or URLs) to visit. This seed list may include web document 204 resources that relate to the specific domain of content to be crawled. As the webpage crawler 202 visits the URLs, the webpage crawler 202 may identify additional web addresses references in those web documents 204 (e.g., links in HTML pages) and add them to the list of URLs to visit. In some instances, the webpage crawler 202 may focus on specific subject matter using techniques such as preferring pages with links back to previously crawled pages, pages with similar terminology compared to previously crawled pages, or pages that are categorized similarly in an ontology of resources. To continue the cooking domain example, the webpage crawler 202 may continuously visit (or periodically revisit) commercial online shopping mall webpages for kitchenware and/or websites for recipes and cooking tips.

The collected web documents 204 crawled by the webpage crawler 202 may be fed into a workflow extractor 206 and a vocabulary extractor 208 so that relevant terms and their relations (such as the name of the ingredients and concept/class hierarchies of cooking techniques) are automatically extracted, refined, and organized. The extraction, refining, and organizing may be performed using natural language processing and/or knowledge synthesis techniques/tools. The collected terms and workflows may be respectively stored in a domain knowledgebase 108 and the workflow database 110, so that users can later re-use the terms and the workflows.

In some examples, a supervised approach may be utilized, where supervision and/or intervention by domain experts may additionally be involved to verify correctness or increase quality of the data stored in knowledgebases. In an example, the composed or modified terms may be manipulated by a user of the client device 102 in communication with the server software 116, e.g., over the communications network 106.

Figure 3:
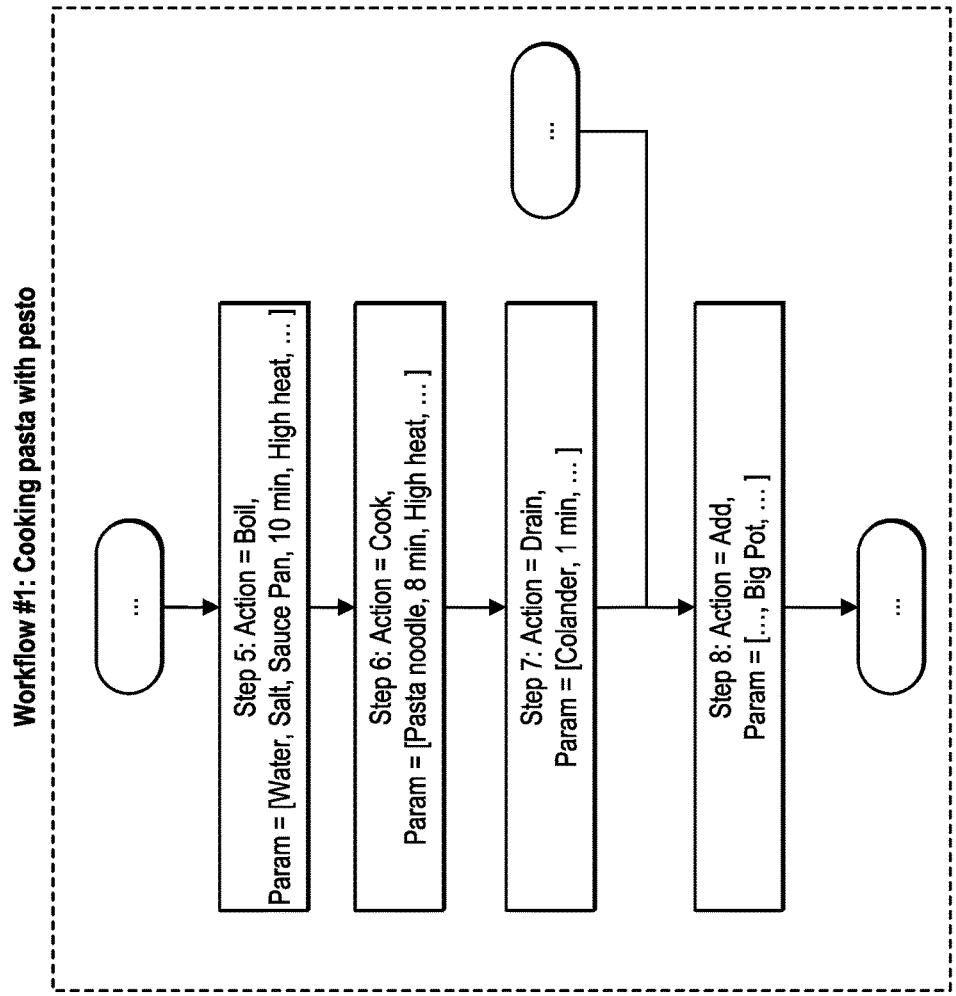
FIG. 3 illustrates an example of a partial workflow.

FIG. 3 illustrates an example 300 of a partial workflow. The partial workflow may be stored in the workflow database 110, in an example. As shown, the partial workflow is a portion of a recipe for cooking pasta with pesto. This workflow may be drafted in accordance with the standardized terms in the cooking domain as defined in the domain knowledgebase 108. Instead of describing the steps as natural language text such as "add water and salt into a saucepan and boil water for 10 minutes," key activities for completion of a workflow step may be described using controlled vocabularies or terminologies, such as "Action=Boil." These controlled vocabularies or terminologies may be stored in the domain knowledgebase 108, populated as discussed above. The parameters related to the key action or other details for the key activities may also be described as a list of standardized terms, e.g., "Param= [Water, Salt, Saucepan, 10 mins, High heat, . . . ]."

Figure 4:
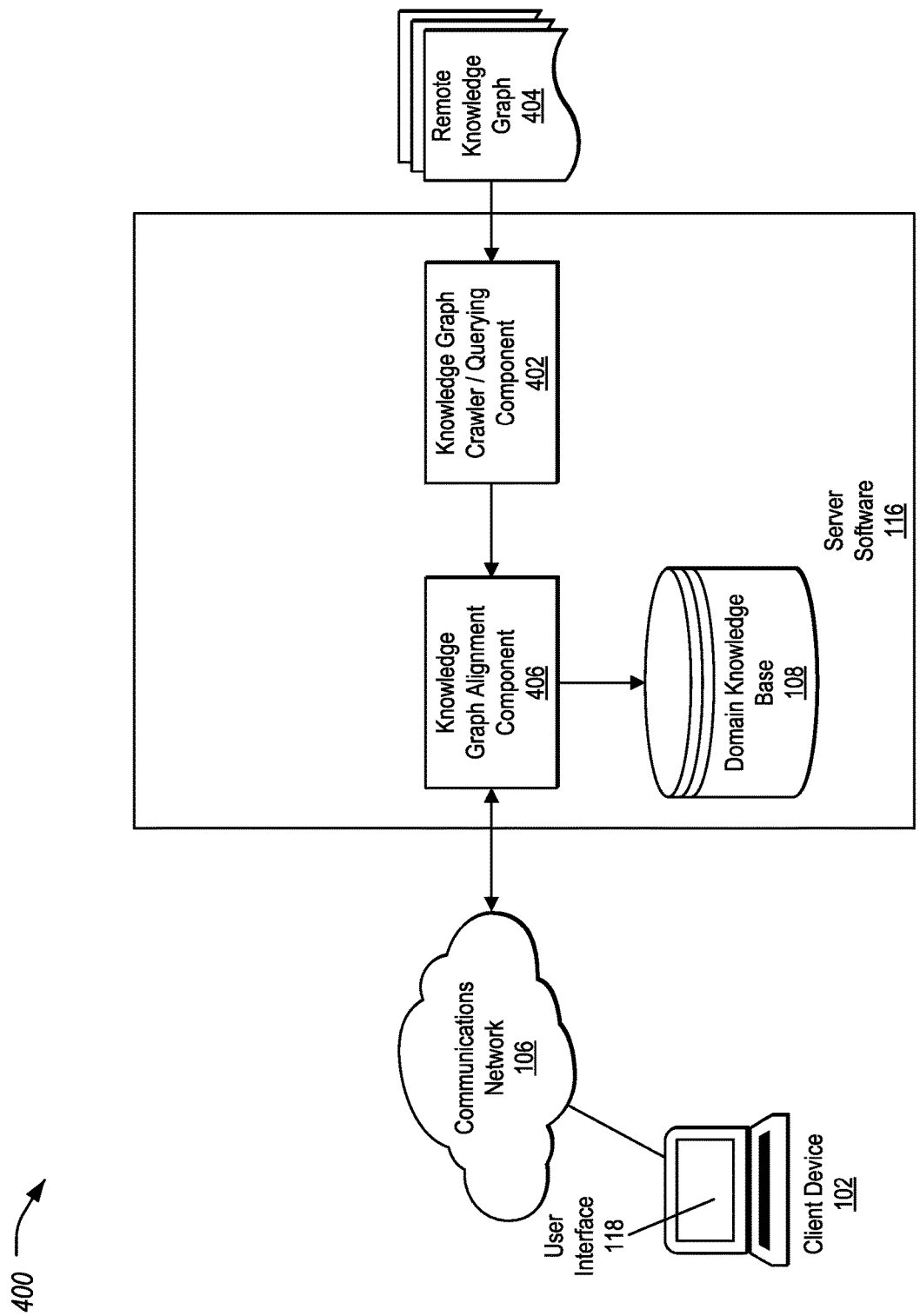
FIG. 4 illustrates an example data flow for updating of knowledge in the domain knowledgebase in the terminology management mode.

FIG. 4 illustrates an example 400 data flow for updating of knowledge in the domain knowledgebase 108 in the terminology management mode. As shown, and similar to as shown in the example 200, a knowledge graph crawler/querying component 402 may periodically or otherwise automatically access a remote knowledge graph 404 to retrieve updated knowledge graph information. This process may also involve spidering or crawling, as discussed above. Or, the knowledge graph crawler/querying component 402 may access the remote knowledge graph 404 responsive to a request from a client device 102 for updated knowledge graph information. This updated knowledge graph information may be provided by the knowledge graph crawler 402 accessing the remote knowledge graph 404 to a knowledge graph alignment component 406, which may access and update the domain knowledgebase 108 with changes to the knowledge graph.

Figure 5:
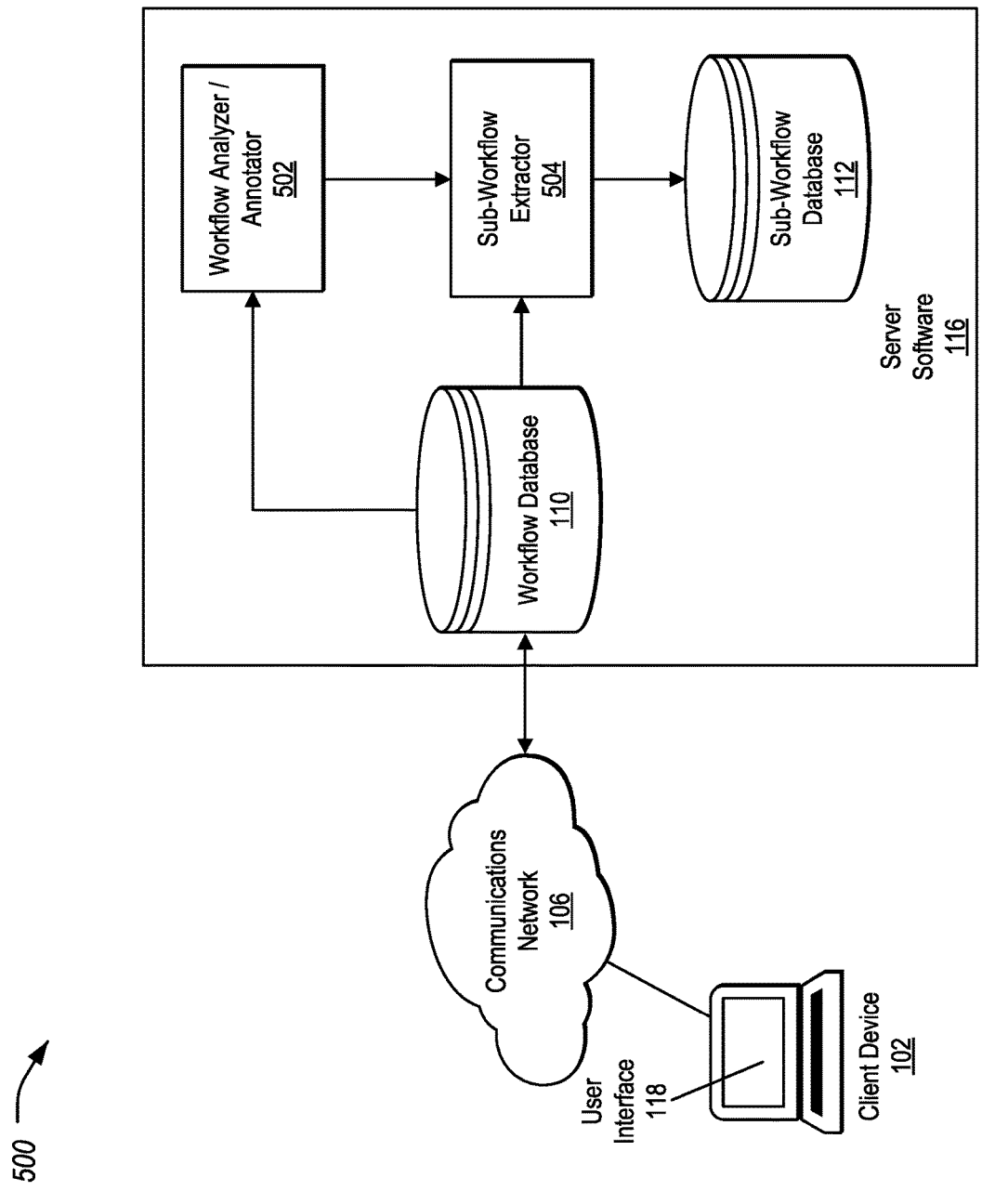
FIG. 5 illustrates an example data flow for collection of workflows and extraction of sub-workflows in the workflow management mode.

FIG. 5 illustrates an example 500 data flow for collection of workflows and extraction of sub-workflows in the workflow management mode. The workflows stored in the workflow database 110 may be analyzed and annotated by the system 100, and reusable parts of the workflows may be extracted as sub-workflows and stored in the sub-workflow database 112. In addition, users may explore and select relevant sub-workflows based on their requirements and initiate a combination process of the sub-workflows to populate new variants of the workflows.

As shown, a workflow analyzer/annotator 502 may receive workflows from the workflow database 110 and may provide an analysis of the workflows to a sub-workflow extractor 504. The sub-workflow extractor 504 may utilize the analysis of the workflows to extract sub-workflows from the workflow database 110. These sub-workflows may be provided by the sub-workflow extractor 504 into the sub-workflow database 110. The composed or modified workflows may be transferred into the system 100 from a remote device. Users may also be able to use the system 100 to compose new workflows or modify existing workflows via the user interface 118. In an example, users may utilize the terms as defined in the domain knowledgebase 108 for composing or modifying workflows.

A purpose of annotating workflows is to allow users or systems to mark-up sub-workflows that may be reusable in the future. The annotation can be added between components of the workflows, e.g., added to edges connecting two workflow steps, so that certain steps can be grouped as a sub-workflow. Items or descriptions may be added as annotations including text, image, video, etc. In one example, the values for annotations may be standardized terms managed by domain knowledgebase 108.

Figure 6:
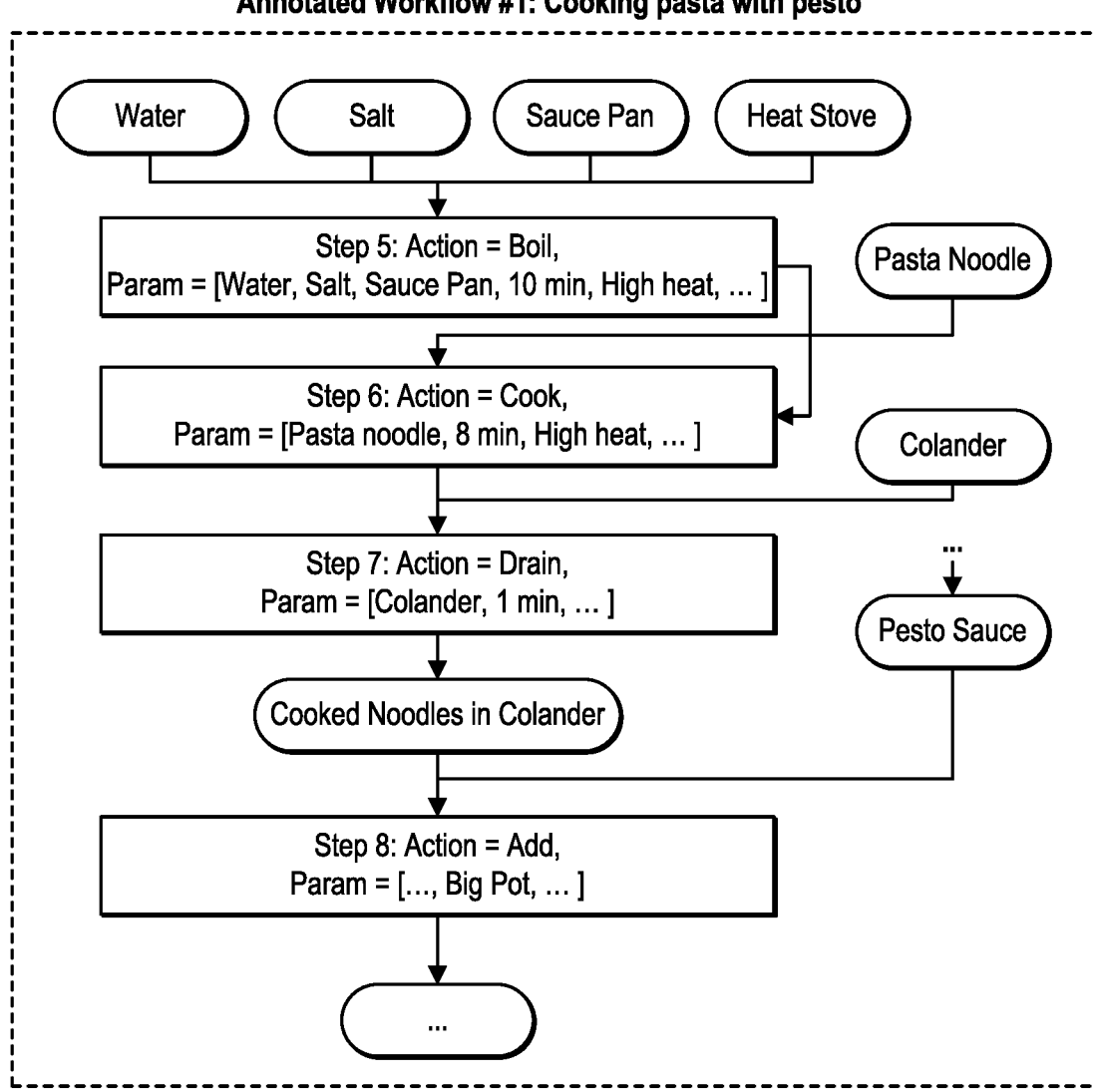
FIG. 6 illustrates an example of an annotated workflow.

FIG. 6 illustrates an example 600 of an annotated workflow. The annotated values may include parameter values of the steps in the workflows or additional descriptions that denote input or output of the steps. In an example, the workflow of FIG. 3 is annotated as shown in FIG. 6. The annotations are represented visually using rounded boxes (e.g., Water, Salt, Saucepan, Heat stove as inputs to step 5). The items described in the annotation boxes may be considered as pre-conditions to be fulfilled for the sub-workflow to be performed. Similarly, the annotations Pasta Noodle and Colander may be added as pre-conditions for steps 6 and 7, respectively. Further, Cooked noodle in a Colander is added after step 7 to specify the intermediate results of step 4-6. Pesto sauce may also be added as an annotation to specify the result of another sub-workflow for making pesto sauce.

Returning to FIG. 5, the positions and the terms for annotations can be determined using various approaches, e.g., a manual approach such as the discussions and/or the agreements from domain experts and/or additionally inclusions of the preferences of users can be considered. In another example, heuristics may be used together for generating annotations. For example, supervised or reinforcement learning techniques may be applied over a result of annotations made by experts so that the system 100 learns preferable positions and labels of annotations from existing annotated workflows. Once learning is completed, the annotated workflow may be validated (e.g., using a manual approach). Other approaches may also be used, e.g., a rule-based approach that considers adding annotations at the points where containers (e.g., Bowl or Saucepan) in the recipe workflows are changed because changing containers implies a processing of ingredients or other intermediate changes is completed.

The annotated workflows may be stored with their annotations in workflow database 110. The stored workflows may also be provided to the sub-workflow extractor 504, which may split the workflows into sub-workflows according to the annotations that exist between steps.

Figure 7:
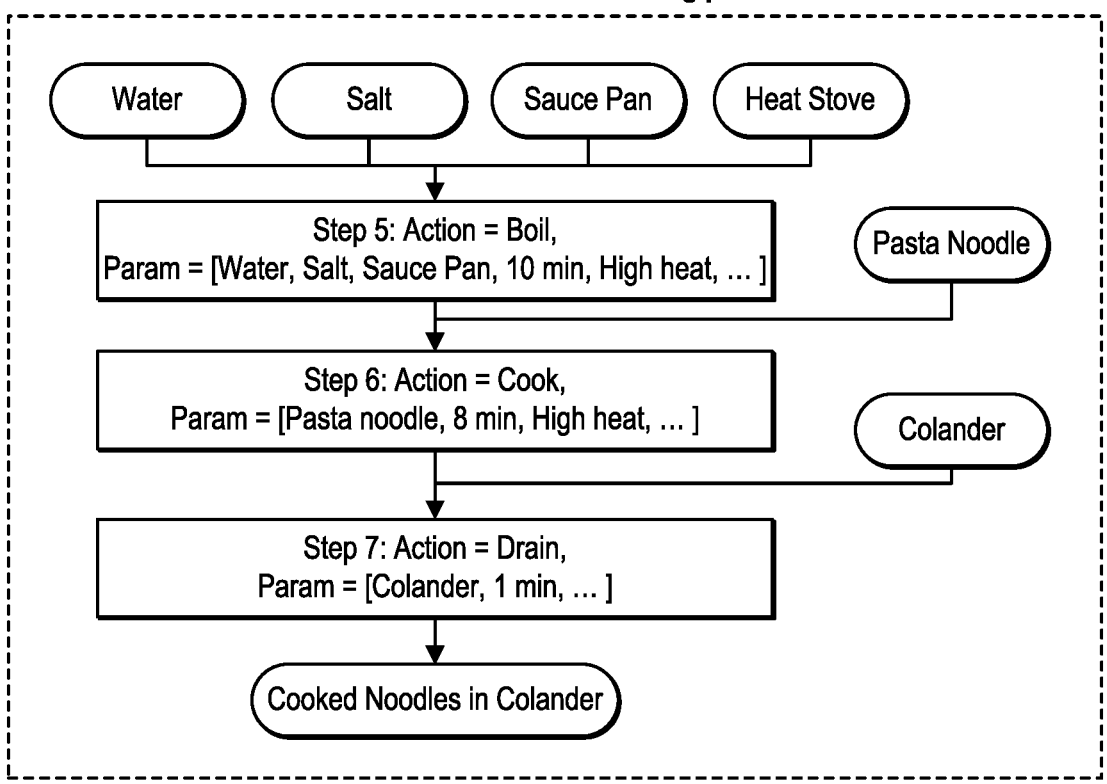
FIG. 7 illustrates an example of a splitting of a workflow into multiple sub-workflows.
Figure 7:
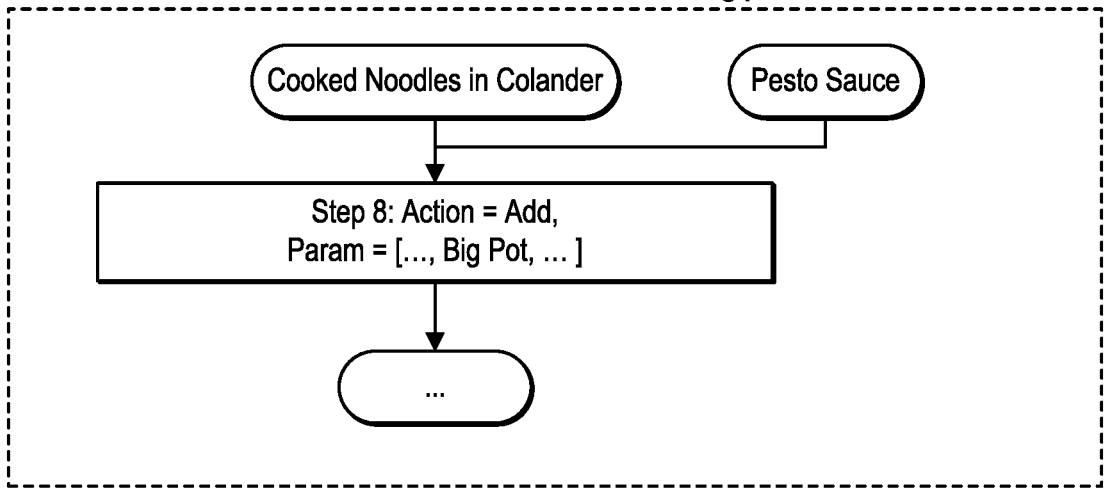

FIG. 7 illustrates an example 700 of a splitting of a workflow into multiple sub-workflows. As shown, the workflow is split at the annotation Cooked noodle in a colander. This split operation generates two sub-workflows: (i) annotated sub-workflow #1 (cooking pasta noodle) and (ii) annotated sub-workflow #2 (adding pesto). The annotation where split operations are applied may be replicated across the sub-workflows, e.g., the annotation "Cooked noodle in a colander" may be included in both of the two shown sub-workflows (for instance, as a result of the first sub-workflow and as a pre-condition of the next sub-workflow).

Figure 8:
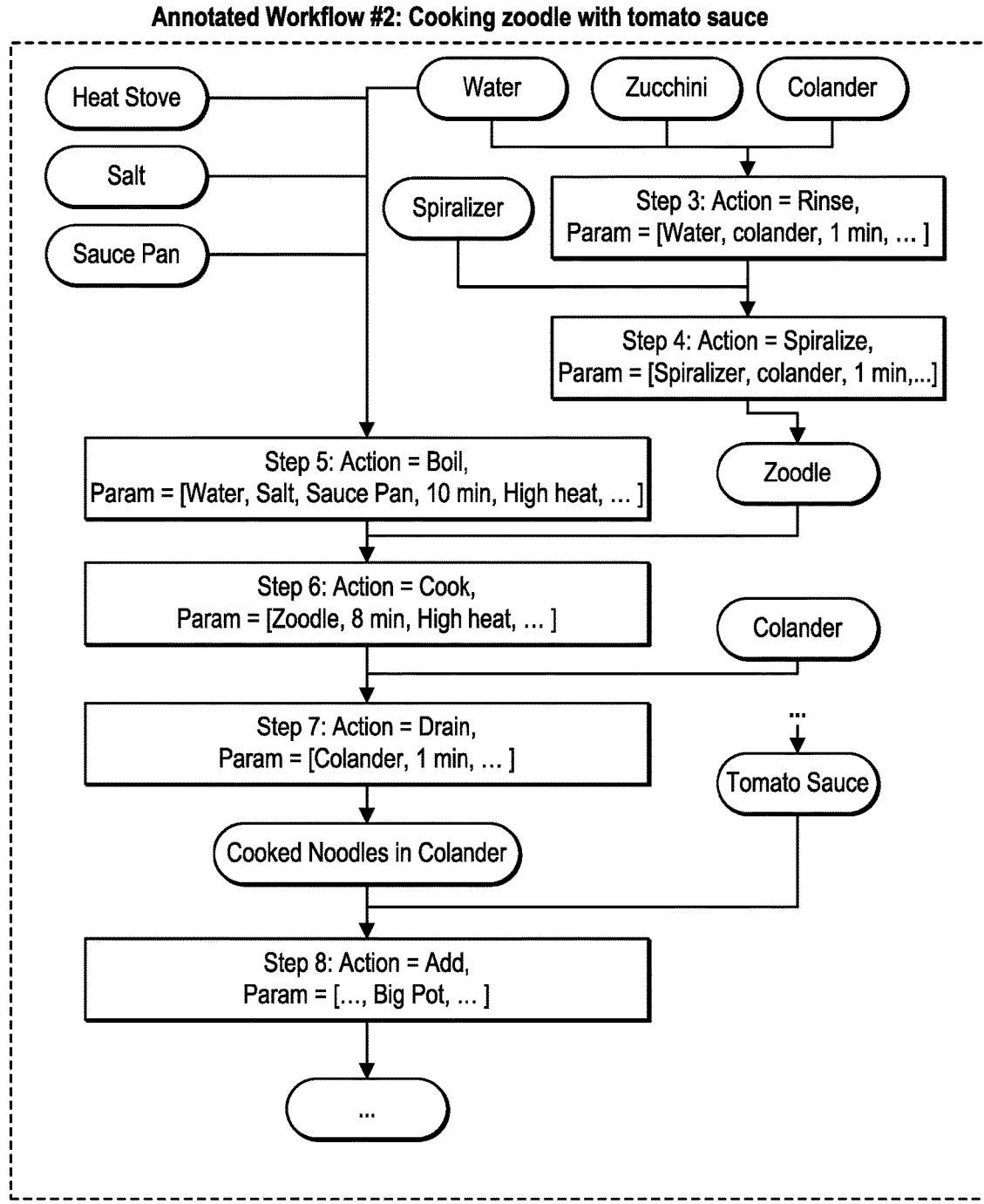
FIG. 8 illustrates an example of an additional annotated workflow.

FIG. 8 illustrates an example 800 of an additional annotated workflow. Similar to the annotated workflow shown in FIG. 5, the annotated workflow in FIG. 8 includes annotated values having parameter values of the steps in the workflows as well as additional descriptions that denote input or output of the steps. As shown, the workflow is for the cooking of zoodle, which is a noodle made from spiralized zucchini, instead of pasta noodles as utilized in the workflow of FIG. 5. Additionally, as another variation, the annotated workflow in FIG. 8 includes the addition of tomato sauce instead of pesto.

Figure 9:
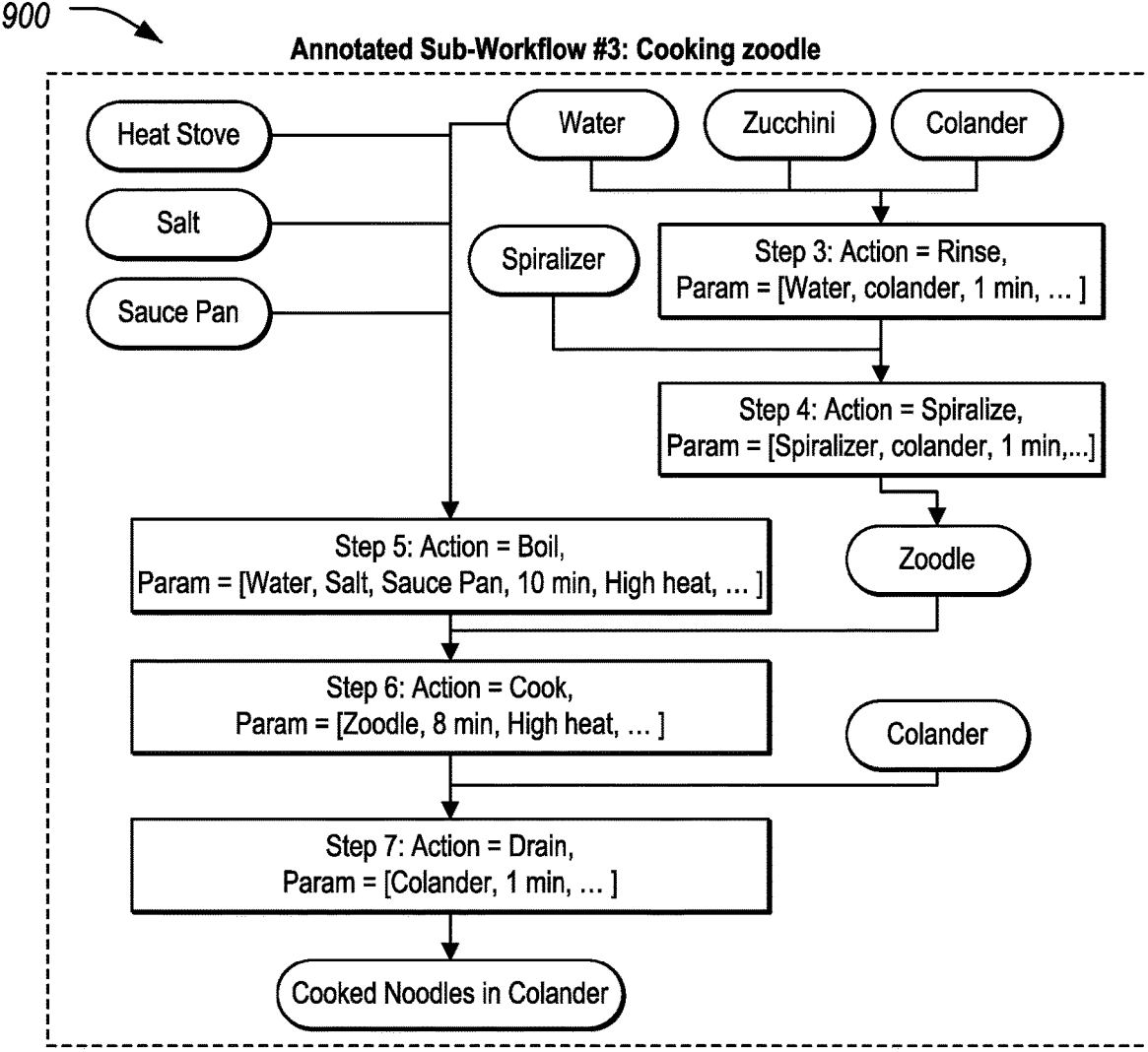
FIG. 9 illustrates an example of a splitting of the additional workflow into multiple sub-workflows.
Figure 9:
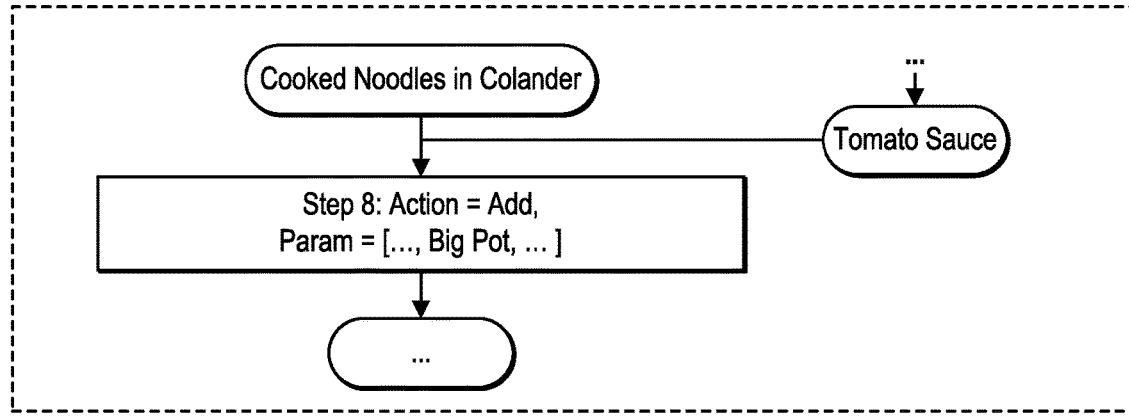

FIG. 9 illustrates an example 900 of a splitting of the additional workflow into multiple sub-workflows. As shown, this additional workflow is again split at the annotation Cooked noodle in a colander. This split operation generates two sub-workflows: (i) annotated sub-workflow #3 (cooking zoodle) and (ii) annotated sub-workflow #4 (mixing with tomato sauce). The annotation where split operations are applied may be replicated across the sub-workflows, e.g., the annotation "Cooked noodle in a colander" may be included in both of the two shown sub-workflows (for instance, as a result of the first sub-workflow and as a pre-condition of the next sub-workflow).

The sub-workflows generated from the split operations may be indexed and stored in the sub-workflow database 112. Various strategies may be developed and used for effective organization and retrieval of relevant sub-workflows. In one example, the sub-workflows may be indexed according to the annotation values or co-indexed with nodes or edges representing workflows. In another example, the sub-workflows may be indexed according to their inputs and/or outputs.

Figure 10:
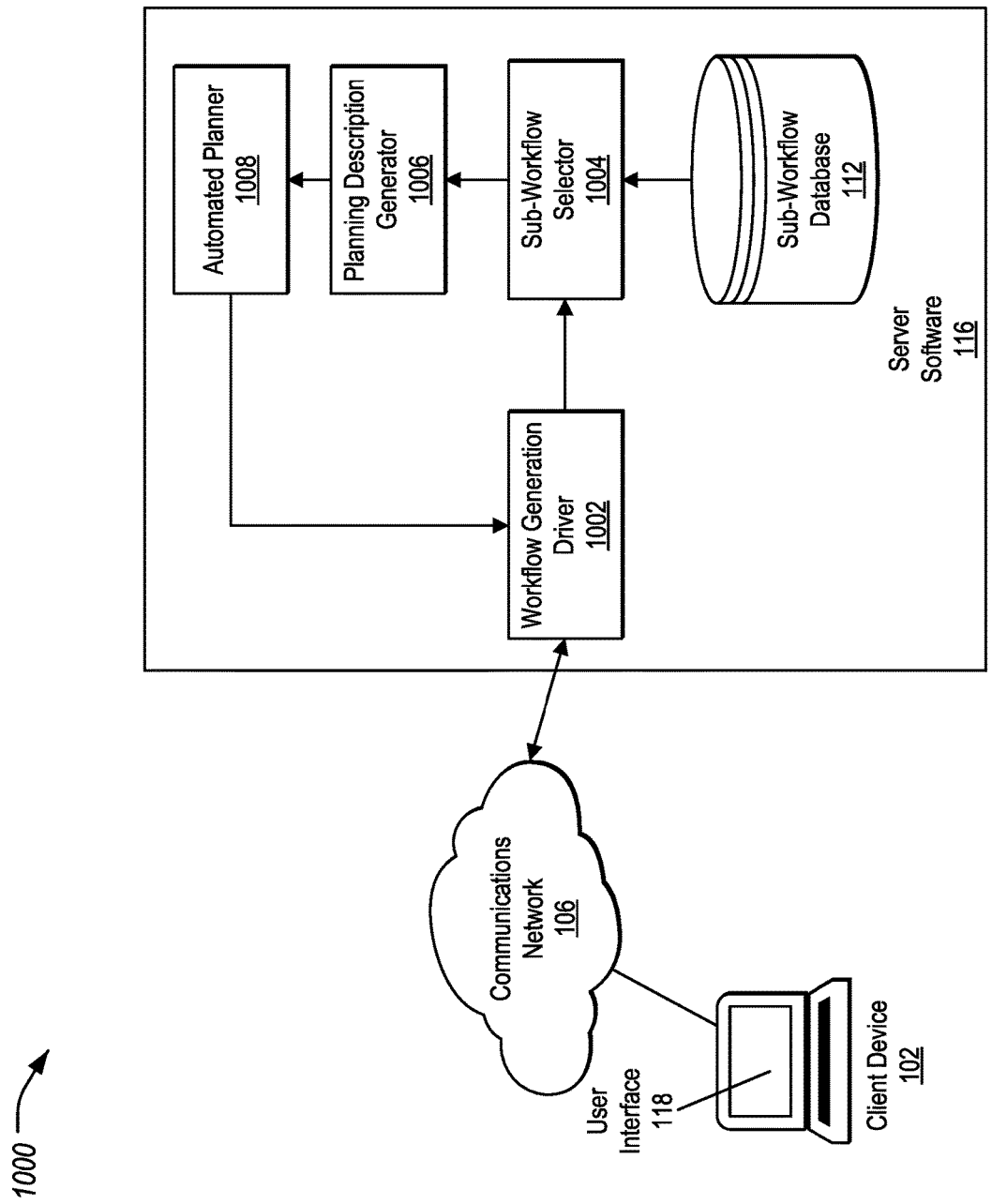
FIG. 10 illustrates an example data flow for assembly of sub-workflows and the generation of new workflows in the workflow management mode.

FIG. 10 illustrates an example 1000 data flow for assembly of sub-workflows and the generation of new workflows in the workflow management mode. As noted above, the sub-workflows may be extracted and collected into the sub-workflow database 112. Once added, users can browse the sub-workflows using the user interface 118. For instance, a user may utilize the client device 102 executing the client software 114 to access over the communications network 106 the server software 116, as shown, that is executed by the server 104. After the request arrived at the server side, it is processed by the workflow generation driver 1002, which is responsible for orchestrating the process of workflow generation. This component controls the sub-workflow selector 1004 which retrieves sub-workflow data from the sub-workflow database 112 so that the data can be sent back to the user interface 118 for selecting relevant sub-workflow data.

Responsive to selection of sub-workflows by a user, the planning description generator 1006 may transform the selected sub-workflows into corresponding planning descriptions. This may be accomplished to allow the sub-workflows to be represented in a format that automatic planners can understand. One such example common format is PDDL, as mentioned above.

Figure 11:
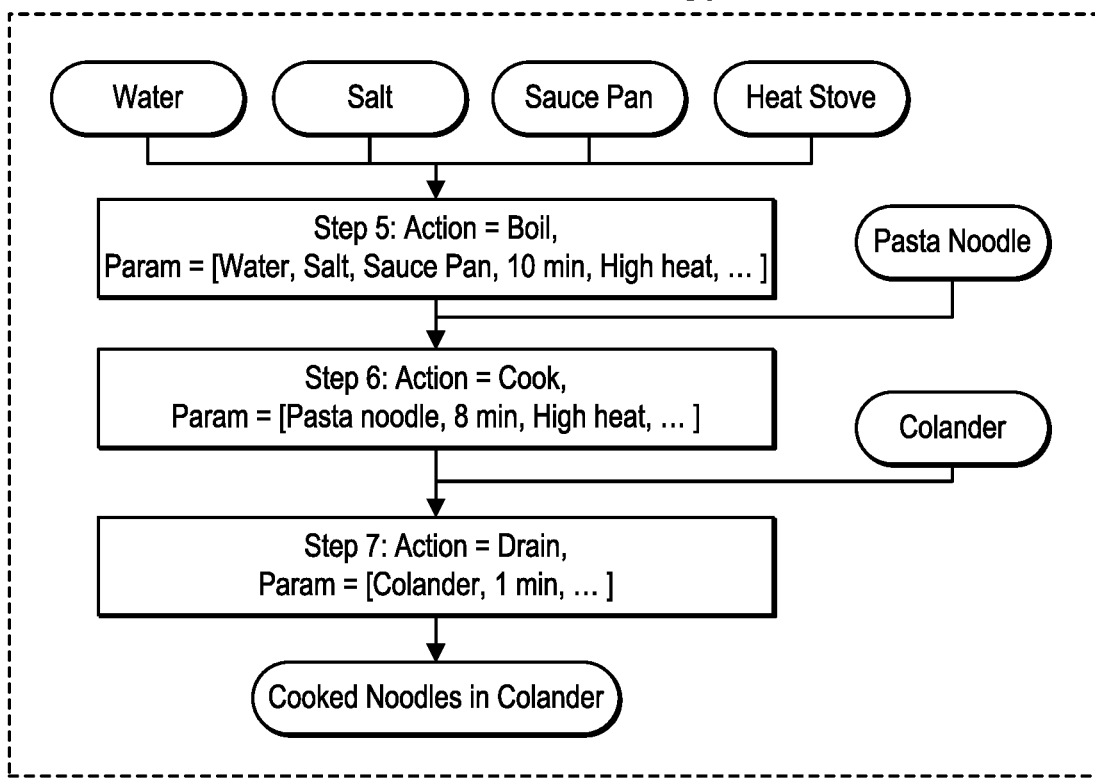
FIG. 11 illustrates an example mapping process of a workflow into a machine-interpretable description.

FIG. 11 illustrates an example 1100 mapping process of a workflow into a machine-interpretable description. As shown, the annotated sub-workflow 1 of FIG. 7 has been converted into PDDL. The PDDL indicates the action performed by the sub-workflow, preconditions of the sub-workflow, and effects of the sub-workflow.

The annotations of the sub-workflow corresponding to the input of the sub-workflow map to predicates or preconditions of the action. In this example, annotations such as Water, Salt, Saucepan, and HeatStove in the sub-workflow #1 are added into the precondition of the action cookedPastaNoodle. As a convention, it is shown in this example that whitespace in terms are removed as a part of the conversion process. The annotations of the sub-workflow corresponding to output of the sub-workflows may be mapped to the predicates for the effect section. In this example, CookedNoodleInColander is added in the effect section of the action description. Additional meta-data may also be added into the planning descriptions to track between steps and action descriptions. For example, machine-readable statements can be added to denote that Step 5, Step 6, and Step 7 of the sub-workflow #1 maps to the action named cookedPastaNoodle.

Returning to FIG. 10, this process may continue through the selected sub-workflows, such that the selected sub-workflows are transformed into corresponding planning descriptions. Once transformed, the planning descriptions may be provided to an automated planner 1008. The automated planner 1008 may explore and compute whether any valid workflows can be generated from the sub-workflows as converted.

Figure 12:
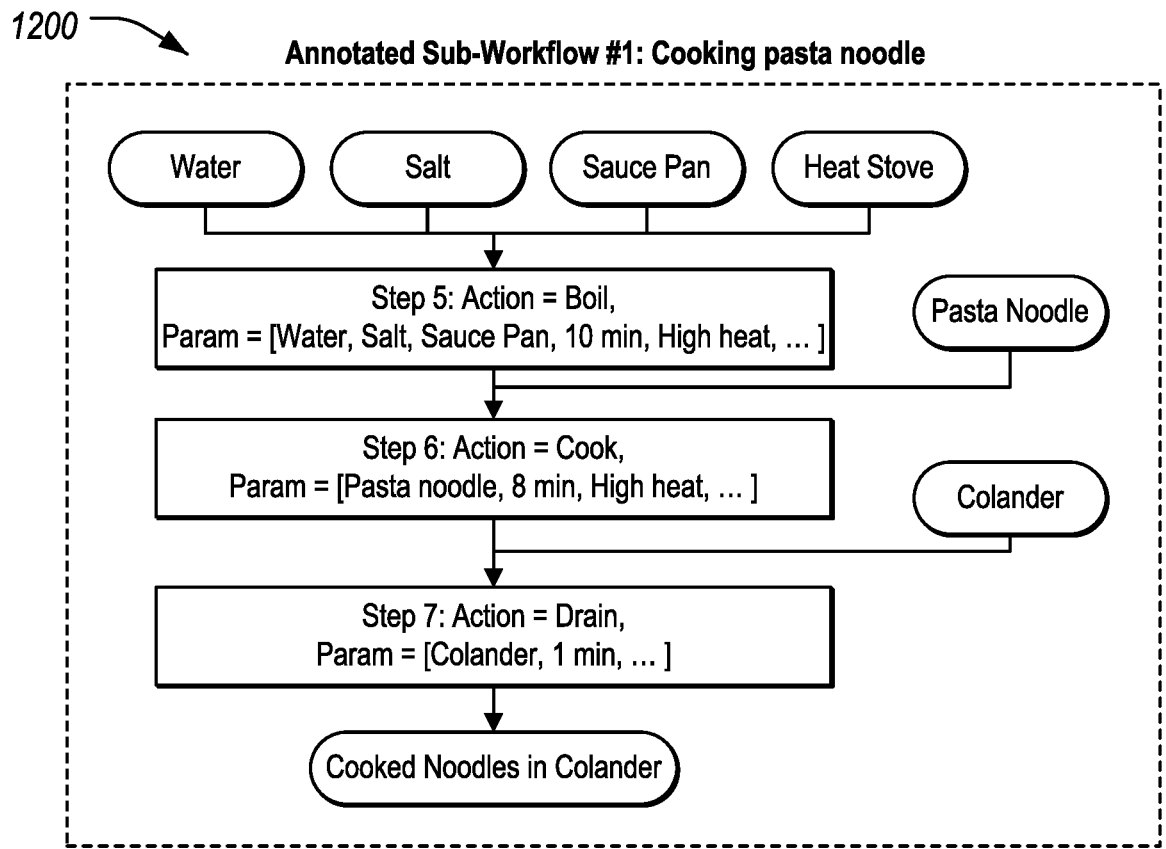
FIG. 12 illustrates an example combination of sub-workflows into a new workflow based on planning descriptions.
Figure 12:
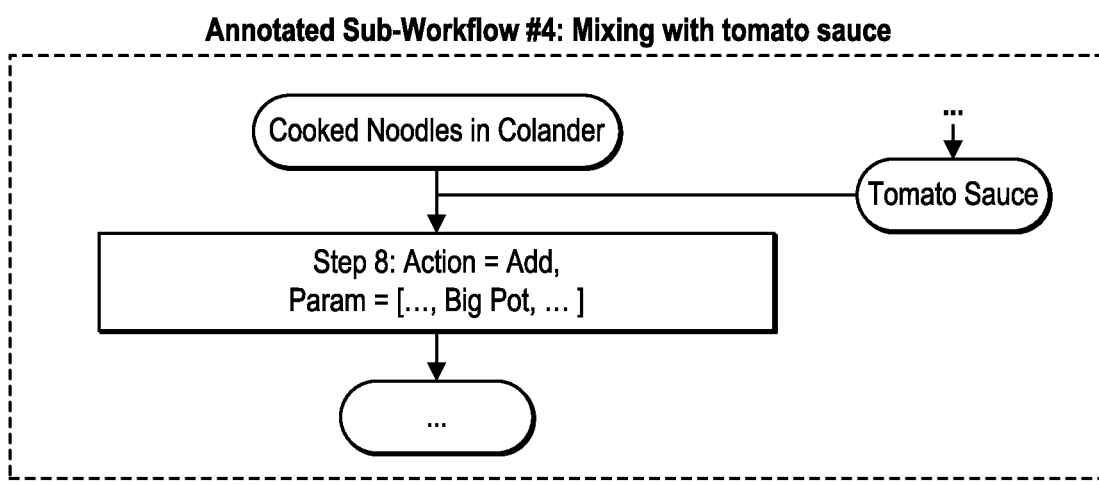

FIG. 12 illustrates an example 1200 combination of sub-workflows into a new workflow based on planning descriptions. The example combination is based on planning descriptions based on the common annotation cooked noodle in a colander, thereby generating new variants of the recipe workflows. As shown, FIG. 12 shows a new recipe flow that combines Zoodle with Pesto.

Figure 13:
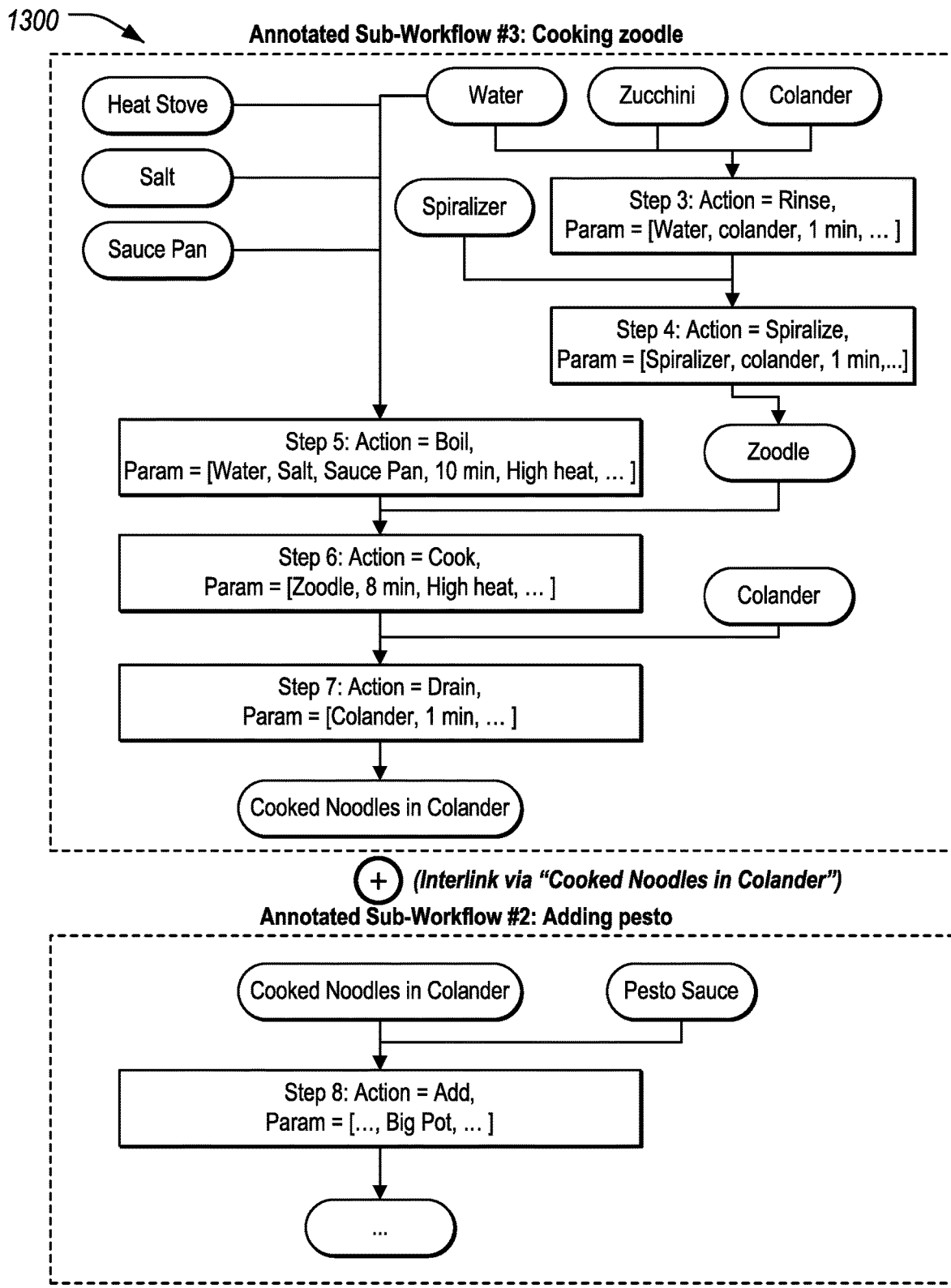
FIG. 13 illustrates an example of another combination of sub-workflows into a new workflow based on planning descriptions.

FIG. 13 illustrates an example 1300 alternate combination of sub-workflows into a new workflow based on planning descriptions. The example combination is also based on planning descriptions based on the common annotation cooked noodle in a colander, thereby generating new variants of the recipe workflows. As shown, FIG. 13 shows a new recipe flow that combines Pasta with Tomato Sauce.

Users may select a group of different sub-workflows based on preferences or constraints (e.g., "I am vegetarian; I will select the sub-workflows or sub-recipes that use only vegetables") and query for the sub-workflows using the automated planner 1008. This may allow users to discover new variants of recipes they may like in an automated manner (e.g., "I'd like to explore and see how many different recipes for vegetarian foods can be generated from the recipes in the knowledgebase").

In the example, the automated planner 1008 may use a Stanford Research Institute Problem Solver (STRIPS)-based planning system for the sake of the discussion. However, it should be noted that other methods or systems that can determine an order of workflow steps based on constraints in the steps may additionally or alternatively be used. For instance, a supervised learning model may be used by training the system to discover and learn models that determine workflow order from given workflows, etc. In such a system, annotations may not be required to be identical to be considered as a potential linking points of sub-workflows. Instead, a probabilistic or non-deterministic approach may be considered. For instance, if the annotation strings to be compared share similarities that can be measured with existing similarity-based metrics (e.g., any distance metrics over the descriptions of the texts in the workflows or over the workflow structures as graphs), then the sub-workflows may be combined and showed to users as a possible new variants of the workflow.

In some examples, the described approach may be enhanced by optimizing the components in the platform. In an example, action descriptions may be pre-generated as the sub-workflows are extracted from the workflows and stored with the corresponding sub-workflows in the sub-workflow database 112. This may minimize the computation and running time of the combining process.

Figure 14:
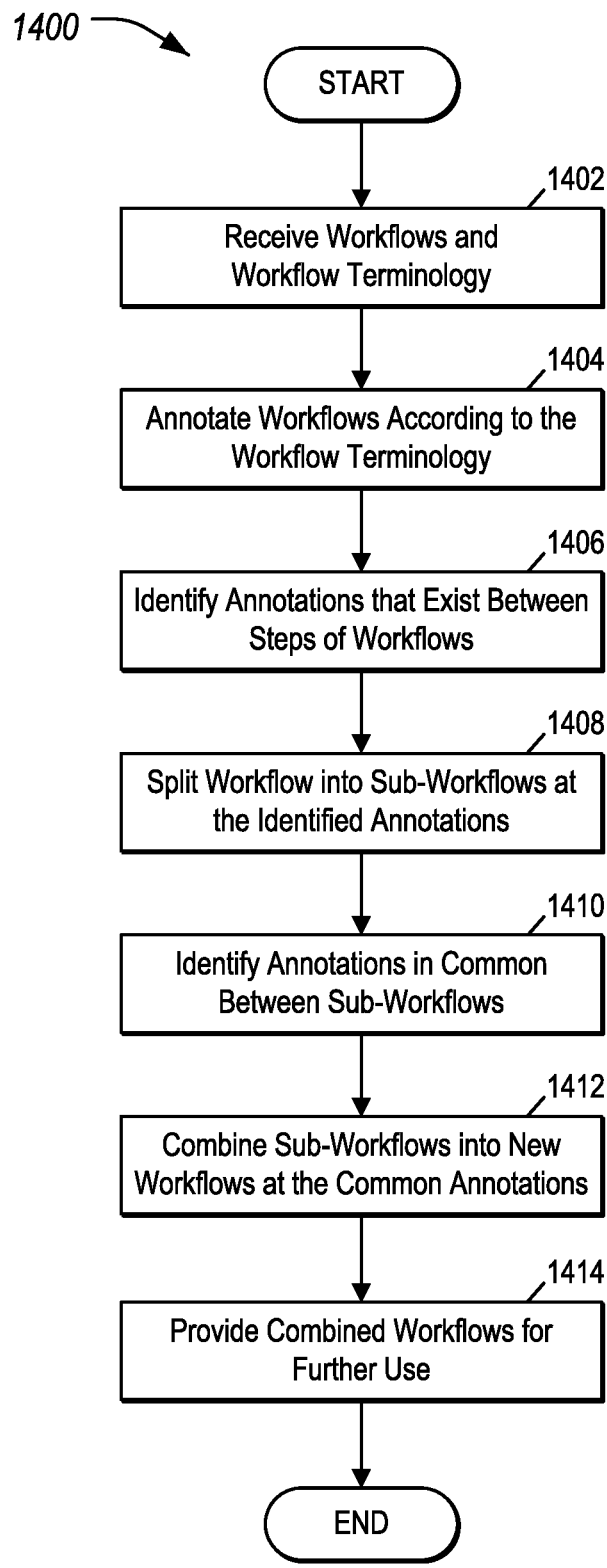
FIG. 14 illustrates an example process for the intelligent organization and automatic combination of workflow data.

FIG. 14 illustrates an example process 1400 for the intelligent organization and automatic combination of workflow data. In an example, the process may be performed by aspects of the system 100 described in detail above.

At operation 1402, the system 100 receives workflows and workflow terminology. In an example, as discussed above with respect to FIGS. 2-5 the terminology management mode of the system 100 may be utilized to standardize and organize terms, as well as to update knowledge in the domain knowledgebase 108, and the workflow management mode of the system 100 may be used for the collection of workflows and extraction of sub-workflows. The terminology and knowledge graph may be stored in the domain knowledgebase 108. The workflows may be stored in the workflow database 110. In an example, the system 100 may periodically crawl Internet information to make such additions to the terminology and knowledge graph stored in the domain knowledgebase 108, and/or to the workflows stored in the workflow database 110. In another example, the information may be received responsive to user input.

At operation 1404, the system 100 annotates the workflows according to the workflow terminology. In an example, as discussed with respect to FIGS. 5-8, annotations may be added to the steps of the workflows that describe pre-conditions to be fulfilled for execution of the respective steps to be performed as well as outputs of the respective steps. In an example, heuristics may be used for generating annotations. For example, supervised or reinforcement learning techniques may be applied over a result of annotations made by experts so that the system 100 learns preferable positions and labels of annotations from existing annotated workflows.

At operation 1406, the system 100 identifies annotations that are split points within the workflows. In an example, the stored workflows may be provided to the sub-workflow extractor 504, which splits the workflows into sub-workflows according to annotations that exist between steps.

At operation 1408, the system 100 splits the workflows into sub-workflows at the identified split points. In an example, the workflows with identified split points may be split into multiple sub-workflows, a first sub-workflow ending with an annotation that is an identified split point, and a second sub-workflow beginning with an annotation that is an identified split point. Examples of such splits are discussed with respect to FIGS. 7-10. The sub-workflows may be stored in the sub-workflow database 112.

At operation 1410, the system 100 identifies annotations in common between sub-workflows. In an example, the system 100 searches the sub-workflow database 112 for annotations that are preconditions for sub-workflows and that are also results of other workflows. In some instances, these sub-workflows may be queried for according to topic or other criteria received from a user of a client device 102. In other examples, these sub-workflows may be autogenerated responsive to the addition of new terminology and/or knowledge graph information to the domain knowledgebase 108, and/or to the addition of new workflows to the workflow database 110.

At operation 1412, the system 100 combines the sub-workflows into new workflows at the common annotations. In an example, the identified sub-workflows are combined into new workflows. Examples of such new combinations are discussed with respect to FIGS. 12-13. Accordingly, sub-workflows of existing workflows may be reused to automatically generate new workflows.

At operation 1414, the system 100 provides the combined workflows for further use. In an example, the combined workflows may be provided to the client device 102 responsive to the query indicated at operation 1410. In another example, the combined workflows may be added to the workflow database 110 for later use. After operation 1414, the process 1400 ends.

Figure 15:
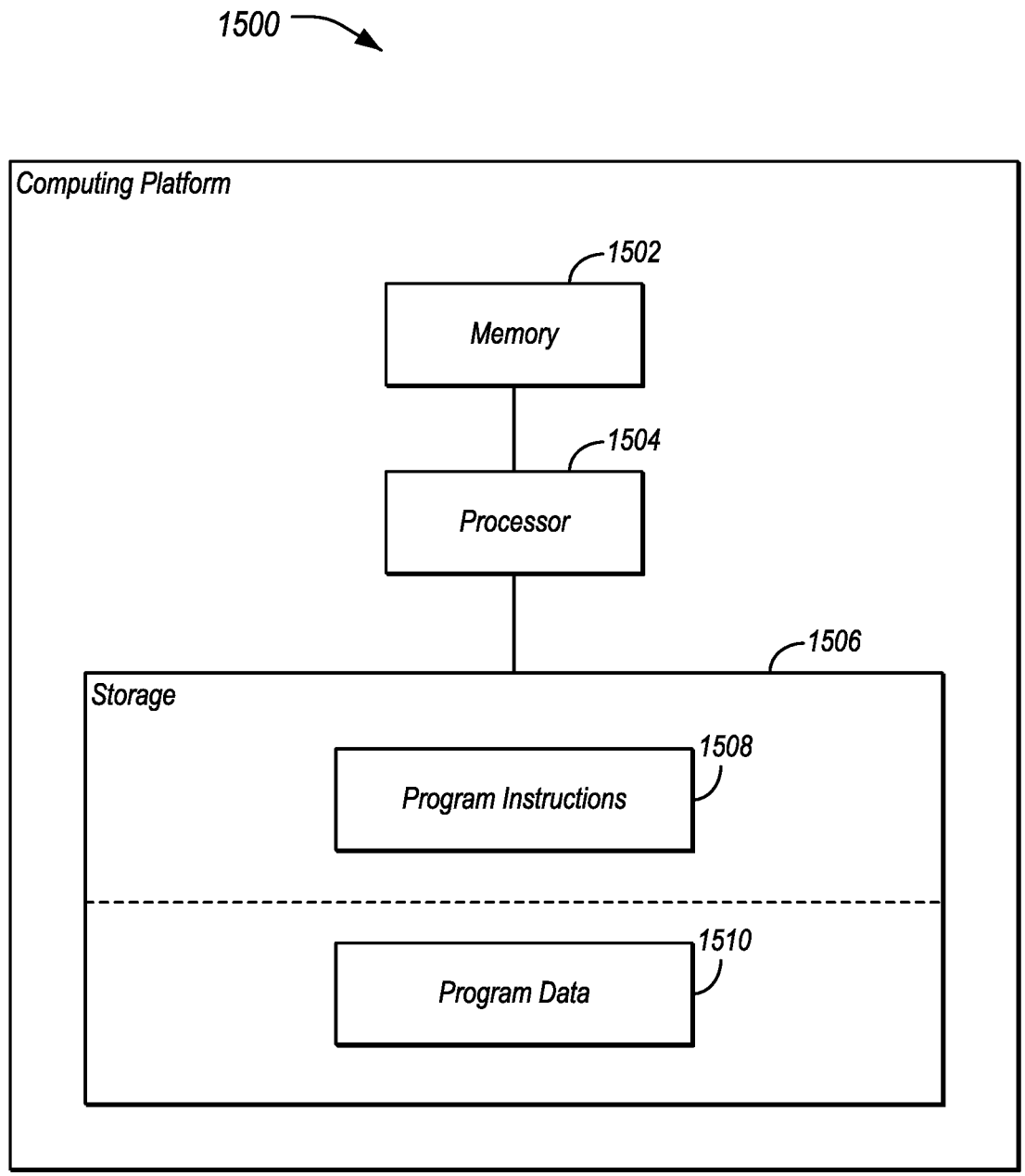
FIG. 15 illustrates an example computing device for the intelligent organization and automatic combination of workflow data.

FIG. 15 illustrates an example computing device 1500 for the intelligent organization and automatic combination of workflow data. Devices discussed herein, such as the client device 102 and workflow management server 104, may include devices such as the computing device 1500. Likewise, the operations performed herein, such as those shown in FIGS. 2-14, may be performed by such computing devices 1500. The computing device 1500 may include memory 1502, processor 1504, and non-volatile storage 1506. The processor 1504 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1502. The memory 1502 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 1506 may include one or more persistent data storage devices such as a hard drive, optical drive, tape drive, non-volatile solid-state device, cloud storage or any other device capable of persistently storing information.

The processor 1504 may be configured to read into memory 1502 and execute computer-executable instructions residing in program instructions 1508 of the non-volatile storage 1506 and embodying algorithms and/or methodologies of one or more embodiments. The program instructions 1508 may include operating systems and applications. The program instructions 1508 may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

Upon execution by the processor 1504, the computer-executable instructions of the program instructions 1508 may cause the computing device 1500 to implement one or more of the algorithms and/or methodologies disclosed herein. The non-volatile storage 1506 may also include data 610 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for workflow recombination, comprising:
   crawling one or more network resources to identify crawled workflows, including to initiate the crawling using a seed list of web addresses, the seed list including web document resources that relate to a topic to be crawled, to identify additional web addresses in the web document resources, and to add the additional web addresses to the one or more network resources to visit to retrieve the crawled workflows;
   crawling the one or more network resources to identify domain terminology so that terms and their relations are automatically extracted, refined, and organized;
   adding the domain terminology to a domain knowledgebase;
   adding the crawled workflows to a workflow database including previously stored workflows;
   annotating the crawled workflows stored in the workflow database utilizing the domain terminology as standardized terms to include in the annotations, each of the crawled workflows including an ordered sequence of steps described using the terms stored in the domain knowledgebase, each of the steps indicating an action to be performed, the annotations indicating pre-conditions to be fulfilled for execution of the respective steps to be performed and outputs of the respective steps;
   extracting sub-workflows from the crawled workflows by splitting the crawled workflows into sub-workflows at annotations that exist between the steps, a first of the sub-workflows including the respective annotation as an output of the first of the sub-workflows, a second of the sub-workflows including the respective annotation as an input to the second of the sub-workflows;
   identifying annotations in common between the crawled sub-workflows as extracted and sub-workflows of the previously stored workflows, including identifying beginning sub-workflows that include the respective annotation as an output and identifying ending sub-workflows that include the respective annotation as an input; and
   recombining the crawled sub-workflows and the sub-workflows of the previously stored workflows into new workflows by splicing together the sub-workflows at the annotations in common, such that each new workflow is formed from one of the beginning sub-workflows followed by one of the ending sub-workflows, the recombining creating new workflows using portions of the sub-workflows of the crawled workflows and portions of the sub-workflows of the previously stored workflows.

2. The method of claim 1, further comprising:
   receiving a query from a client device indicating a topic for workflows;
   identifying the workflows as being the workflows related to the topic; and
   providing the new workflows to the client device responsive to the query.

3. The method of claim 1, further comprising adding the new workflows to the workflows stored in the workflow database.

4. The method of claim 1, further comprising:
crawling the one or more network resources to identify yet further crawled workflows;
adding the further crawled workflows to the workflow database;
further annotating, extracting, identifying and recombining the further crawled sub-workflows, the sub-workflows of the previously stored workflows, and the sub-workflows of the crawled workflows into further new workflows; and
adding the further new workflows to the workflows stored in the workflow database.

5. The method of claim 1, further comprising:
translating the workflows into planning descriptions in a standardized computer-readable workflow format; and
operating on the workflows in the standardized computer-readable workflow format.

6. A system for workflow recombination, comprising:
a workflow database;
a domain knowledgebase; and
a processor programmed to:
receive a query from a client device indicating a topic for crawled workflows;
crawl one or more network resources to identify the crawled workflows, including to initiate the crawl using a seed list of web addresses, the seed list including web document resources that relate to the topic to be crawled, to identify additional web addresses in the web document resources, and to add the additional web addresses to the one or more network resources to visit to retrieve the crawled workflows;
crawl the one or more network resources to identify domain terminology so that terms and their relations are automatically extracted, refined, and organized;
add the domain terminology to a domain knowledgebase;
add the crawled workflows to the workflow database including previously stored workflows;
annotate the crawled workflows stored in the workflow database utilizing the domain terminology as standardized terms to include in the annotations, each of the crawled workflows including an ordered sequence of steps, each of the steps indicating an action to be performed described using the terms stored in the domain knowledgebase, the annotations indicating pre-conditions to be fulfilled for execution of the respective steps to be performed and outputs of the respective steps, the pre-conditions and outputs being specified in the annotations as standardized terms from the domain knowledgebase;
extract sub-workflows from the crawled workflows by splitting the crawled workflows into sub-workflows at annotations that exist between the steps, a first of the sub-workflows including the respective annotation as an output of the first of the sub-workflows, a second of the sub-workflows including the respective annotation as an input to the second of the sub-workflows;
identify annotations in common between the crawled sub-workflows as extracted and sub-workflows of the previously stored workflows, including identifying beginning sub-workflows that include the respective annotation as an output and identifying ending sub-workflows that include the respective annotation as an input; and
recombine the crawled sub-workflows and the sub-workflows of the previously stored workflows into new workflows by splicing together the sub-workflows at the annotations in common, such that each new workflow is formed from one of the beginning sub-workflows followed by one of the ending sub-workflows, the recombining creating new workflows using portions of the sub-workflows of the crawled workflows and portions of the sub-workflows of the previously stored workflows.

7. The system of claim 6, wherein the processor is further programmed to:
receive a query from a client device indicating a topic for workflows;
identify the workflows as being the workflows related to the topic; and
provide the new workflows to the client device responsive to the query.

8. The system of claim 6, wherein the processor is further programmed to add the new workflows to the workflows stored in the workflow database.

9. The system of claim 6, wherein the processor is further programmed to:
crawl the one or more network resources to identify yet further crawled workflows;
add the further crawled workflows to the workflow database;
further annotate, extract, identify and recombine the further crawled sub-workflows, the sub-workflows of the previously stored workflows, and the sub-workflows of the crawled workflows into further new workflows; and
add the further new workflows to the workflows stored in the workflow database.

10. The system of claim 6, wherein the processor is further programmed to:
translate the workflows into planning descriptions in a standardized computer-readable workflow format; and
operate on the workflows in the standardized computer-readable workflow format.

11. A non-transitory computer-readable medium comprising instructions for workflow recombination that, when executed by a processor, cause the processor to:
receive a query from a client device indicating a topic for crawled workflows;
crawl one or more network resources to identify the crawled workflows, including to initiate the crawl using a seed list of web addresses, the seed list including web document resources that relate to the topic to be crawled, to identify additional web addresses in the web document resources, and to add the additional web addresses to the one or more network resources to visit to retrieve the crawled workflows;
crawl the one or more network resources to identify domain terminology so that terms and their relations are automatically extracted, refined, and organized;
add the domain terminology to a domain knowledgebase;
add the crawled workflows to a workflow database including previously stored workflows;
annotate the crawled workflows stored in the workflow database utilizing the domain terminology as standardized terms to include in the annotations, each of the workflows including an ordered sequence of steps, each of the steps indicating an action to be performed described using the terms stored in the domain knowledgebase, the annotations indicating pre-conditions to be fulfilled for execution of the respective steps to be performed and outputs of the respective steps, the pre-conditions and outputs being specified in the annotations as standardized terms from the domain knowledgebase;

extract sub-workflows from the crawled workflows by splitting the crawled workflows into sub-workflows at annotations that exist between the steps, a first of the sub-workflows including the respective annotation as an output of the first of the sub-workflows, a second of the sub-workflows including the respective annotation as an input to the second of the sub-workflows;

identify annotations in common between the crawled sub-workflows as extracted and sub-workflows of the previously stored workflows, including identifying beginning sub-workflows that include the respective annotation as an output and identifying ending sub-workflows that include the respective annotation as an input; and recombine the crawled sub-workflows and the sub-workflows of the previously stored workflows into new workflows by splicing together the sub-workflows at the annotations in common, such that each new workflow is formed from one of the beginning sub-workflows followed by one of the ending sub-workflows, the recombining creating new workflows using portions of the sub-workflows of the crawled workflows and portions of the sub-workflows of the previously stored workflows.

12. The medium of claim 11, further comprising instructions that, when executed by the processor, cause the processor to:

receive a query from a client device indicating a topic for workflows;

identify the workflows as being the workflows related to the topic; and provide the new workflows to the client device responsive to the query.

13. The medium of claim 11, further comprising instructions that, when executed by the processor, cause the processor to add the new workflows to the workflows stored in the workflow database.

14. The medium of claim 11, further comprising instructions that, when executed by the processor, cause the processor to:

crawl the one or more network resources to identify further crawled workflows;

add the further crawled workflows to the workflow database;

further annotate, extract, identify and recombine the further crawled sub-workflows, the sub-workflows of the previously stored workflows, and the sub-workflows of the crawled workflows into further new workflows; and add the further new workflows to the workflows stored in the workflow database.

15. The medium of claim 11, further comprising instructions that, when executed by the processor, cause the processor to:

translate the workflows into planning descriptions in a standardized computer-readable workflow format; and operate on the workflows in the standardized computer-readable workflow format.

16. The method of claim 1, further comprising:

receiving a query from a client device indicating the topic for the crawled workflows.

17. The method of claim 1, further comprising:

receiving a selection from the sub-workflows; and initiating a combination process to populate new variants of workflows that include the selected sub-workflows.

18. The method of claim 1, further comprising:

focusing the webpage crawler on specific subject matter by one or more of preferring pages with links back to previously crawled pages, preferring pages with similar terminology compared to the previously crawled pages, and/or preferring pages that are categorized similar to the previously crawled pages in an ontology of resources.

* * * * *